United States Patent Office 2,904,533
Patented Sept. 15, 1959

2,904,533

PREPARATION OF UNSATURATED POLYESTERS BY THE REACTION OF, FIRST, ISOPHTHALIC ACID AND A GLYCOL, FOLLOWED BY REACTION WITH UNSATURATED ALIPHATIC POLYBASIC ACID

Earl F. Carlston, Richmond, and Gordon B. Johnson, Berkeley, Calif., assignors to California Research Corporation, San Francisco, Calif., a corporation of Delaware No Drawing. Application September 23, 1954
Serial No. 458,006

7 Claims. (Cl. 260—75)

This invention relates to an improved process for the production of resinous compositions of the alkyd type. More particularly, the invention has to do with a process for the preparation of unsaturated polyesters by the interaction, first, of a polyhydric alcohol with isophthalic acid, followed by reaction with an unsaturated aliphatic polybasic acid.

Unsaturated polyester resins obtained by the reaction of a polyhydric alcohol, e.g., ethylene glycol, and an unsaturated aliphatic polybasic acid, e.g., maleic or fumaric, a portion of which is replaced with an aromatic polybasic acid, e.g., phthalic, are known. It is also known that these resins may be desirably modified by admixing with a solubilizing vinyl monomer, e.g., styrene, which later can be made to react with the unsaturated polyester resin to produce an infusible, insoluble resinous composition.

It has now been found that a superior unsaturated polyester resin can be prepared from isophthalic acid, a polyhydric alcohol and an unsaturated aliphatic polybasic acid by following a critical sequence of steps. We have accordingly found that if isophthalic acid is first reacted with all of the polyhydric alcohol, followed by condensation with the unsaturated aliphatic polybasic acid, an unsaturated polyester resinous composition is obtained which has unexpected or unpredictable advantages. Included among these are a higher viscosity, and, as a result, improved flexural and impact strengths, higher heat distortion and softening temperatures.

In the preparation of the resinous compositions of the invention, conventional principles are followed. Thus, the isophthalic acid and stoichiometric excess of polyhydric alcohol, preferably a glycol, e.g., propylene glycol, are heated to reaction temperatures, that is, to a temperature at which water is expelled from the system, the reaction being continued to a low acid number of the order of 10, and preferably below 5. The reaction is preferably conducted under an inert atmosphere, e.g., nitrogen or carbon dioxide. In the esterification of the isophthalic acid with the polyhydric alcohol to give a low molecular weight polymer, temperatures of the order of 188° C. to 230° C. and reaction times of 6 hours to 8 hours are usual. When the esterification reaction is complete, as evidenced by the cessation of water formation, the unsaturated aliphatic polybasic acid, preferably an alpha, beta-unsaturated acid, is added and caused to react with the esterification product of isophthalic acid and polyhydric alcohol. This reaction is also effected preferably under an inert atmosphere at temperatures usually of the order of 215° C. to 230° C. and for a period of time ranging from about 10 hours to 12 hours.

As an example of the preparation of a resinous composition in accordance with the invention, parts being by weight, 166 parts of isophthalic acid and 160 parts of propylene glycol were heated under an inert atmosphere of nitrogen at a temperature of 188° C. in a vessel provided with a steam-jacketed reflux condenser for removal of the water of condensation. Heating was continued for 6 hours; that is, until water ceased to be expelled from the reaction zone and the acid number was below 2. 98 parts of maleic anhydride was then added, the reactants being maintained under an atmosphere of nitrogen as before. The temperature was maintained at 215° C. for a period of 11 hours. The reaction mixture next was allowed to cool, and hard, brittle resin was obtained.

In order further to illustrate the practice and advantages of the invention, a number of unsaturated polyesters were made with propylene glycol (1,2-propanediol). All formulations contained a 5 mol percent excess of propylene glycol over the total acid material employed, both phthalic, isophthalic and unsaturated aliphatic polybasic acid. A three-neck, round bottom flask was used as a kettle, fitted with a stirrer, inert gas inlet, thermometer, reflux condenser, and a receiver for collecting volatile products of the reaction. The reflux condenser was fitted with a thermometer to measure the temperature of the overhead vapors and with a steam jacket. The reflux condenser was employed to separate water of esterification from the refluxing glycol and to return the glycol to the kettle. An electric mantle was employed as the source of heat, and the top half of the flask was wrapped in glass wool.

Except where noted in the table below, all the materials were charged to the kettle at once, and reaction effected in the conventional manner. The other runs were performed in accordance with the invention, that is, all of the propylene glycol was first made to react with the phthalic or isophthalic acid, to an acid number of less than 2, followed by addition of the maleic anhydride.

Esterification was conducted under a slow stream of oxygen-free nitrogen and with vigorous glycol reflux. The vapor temperature at the top of the reflux condenser was maintained at a maximum of 105° C. A cooking time of 11 hours at a polymerization temperature of 215° C. was used in all instances.

TABLE I

Physical properties of unsaturated polyesters cooked at 215° C. for 11 hours

| Composition of polyester, mol ratio of acids | Acid number, mg. KOH per gm. of resin | Softening temperature, °C. | Viscosity, centipoises at 25° C., styrene content | | | |
|---|---|---|---|---|---|---|
| | | | 20% | 40% | 50% | 60% |
| MA:PA [1] | | | | | | |
| (1) 1:1 | 31 | 30 | 2,500 | 300 | 65 | 18 |
| (2) 1:2 | 32 | 32 | 1,800 | 225 | 50 | 14 |
| (3) 1:1 [3] | 18 | 30 | 2,700 | 340 | 85 | 22 |
| (4) 1:2 [3] | 25 | 35 | 2,700 | 290 | 65 | 15 |
| MA:IPA [2] | | | | | | |
| (5) 1:1 | 24 | 51 | 12,300 | 980 | 140 | 41 |
| (6) 1:2 | 17 | 62 | 9,800 | 760 | 125 | 22 |
| (7) 1:1 [3] | 16 | 60 | 27,000 | 2,270 | 370 | 100 |
| (8) 1:2 [3] | 15 | 70 | 30,000 | 2,000 | 330 | 75 |

[1] MA:PA = maleic anhydride:phthalic anhydride.
[2] MA:IPA = maleic anhydride:isophthalic acid.
[3] Maleic anhydride was withheld until phthalic acids were reacted to acid numbers of less than 2, and time at 215° C. was measured after the maleic was added.

In the above table, softening temperature is that temperature at which the unsaturated polyester becomes soft and was determined by placing a sample of the powdered resin on a hot-stage microscope and observing when the resin starts to flow under the pressure of a spatula applied by hand. Viscosity of the unsaturated polyesters, on the other hand, was measured in styrene, using Gardner-Holt viscosity standards. In making the solutions, crushed resin passing through a 32 mesh per square inch screen was dissolved in the styrene, the solutions containing, in addition, 0.05% p-tert-butylcatechol as inhibitor for room temperature stability.

It will be noted from the table that the softening temperatures of the resins prepared in accordance with the invention, runs 7 and 8, were considerably higher than those of resins prepared in conventional manner, runs 5 and 6, thus making the resins easier to store. When phthalic anhydride was employed, but slight improvement was noted when the process of the invention was employed, runs 3 and 4, as compared with the conventional process of making the resins, runs 1 and 2. Even more outstanding are the viscosity data. Thus, with resins prepared in accordance with the invention employing isophthalic acid, the viscosities were more than double those of isophthalic containing resins prepared in conventional manner. When phthalic anhydride was employed in place of isophthalic acid, only a slight improvement is noted.

As is recognized in the art, certain advantages flow from the fact that the resins possess a high viscosity. Thus, an advantage resides in the fact that greater dilution with a lower cost copolymerizable vinyl monomer, e.g., styrene, may be effected. Other important advantages, as already noted, are improved flexural strength and impact strength, and heat distortion temperature, that is, the temperature at which the resin deforms under a given load.

To illustrate, Table II presents heat distortion temperature data of cured, unfilled polyester-styrene copolymers. These were prepared from the polyesters shown in Table I. The polyester-styrene solutions were cured with a mixture of 0.5% benzoyl peroxide (solution of 50% tricresyl phosphate and 50% of benzoyl peroxide) and 0.3% methylethylketone peroxide (solution of 60% methylethylketone peroxide and 40% of dimethyl phthalate) with 0.01% cobalt (as cobalt naphthenate) as a promoter. The solutions were cured in a circulating air oven held at 38° C. for four hours, followed by a gradual increase in the temperature of the oven over a period of three more hours at 135° C. and held at that temperature for one hour to complete the cure. Heat distortion temperature was determined with a five-bar Tinius-Olsen heat distortion apparatus in accordance with the requirements of ASTM method D–648–45–T.

TABLE II

| Mol ratio acids | Styrene content | | | |
| --- | --- | --- | --- | --- |
|  | 30% | 40% | 50% | 60% |
|  | Heat distortion temp., ° C. | | | |
| MA:IPA [1] | | | | |
| (5) 1:1 | 96 | 102 | 102 | 99 |
| (6) 1:2 | 70 | 74 | 79 | 14 |
| (7) 1:1 [2] | 122 | 125 | 124 | 116 |
| (8) 1:2 [2] | 89 | 96 | 96 | 96 |

[1] MA:IPA=maleic anhydride:isophthalic acid.
[2] Resins prepared by reacting all of propylene glycol with isophthalic acid, followed by addition of maleic anhydride.

From the table it will be noted that the heat distortion temperatures of the copolymers prepared in accordance with the invention, runs 7 and 8, are considerably higher than those of resins prepared in the conventional manner, runs 5 and 6.

In carrying out the invention, an excess of the polyhydric alcohol over the total acid material, isophthalic and aliphatic acid, is employed. A 3% to 5% stoichiometric excess of glycol over the acid material has been found satisfactory.

The isophthalic acid is employed in amounts ranging from 0.5 mol to 4 mols per mol of the unsaturated aliphatic polybasic acid.

As will occur to those skilled in the art, the unsaturated polyester may also be modified with other acids, such as succinic acid and its anhydride, adipic acid, azelaic acid, sebacic acid, etc.

Suitable glycols are the mono- and polyglycols, such as ethylene glycol, propylene glycol, diethylene glycol, triethylene glycol. As is known in the art, a small amount of higher functional polyhydric alcohols, such as glycerol and pentaerythritol, may be employed in place of the aforementioned glycols.

As indicated, the unsaturated polyesters may be desirably modified by admixing with a solubilizing vinyl monomer. As examples of the vinyl monomer, in addition to the preferred styrene, may be mentioned other aryl monoolefins, such as ring-substituted styrenes, for example, mono- and polyalkyl styrenes, mono- and polychlorostyrenes, in which the alkyl and chlorine radicals are substituted on the ring, etc. Also suitable are other vinyl type compounds, such as vinyl esters, ketones and ethers; vinylidene halides, acrylic acid and its derivatives, e.g., amides, esters and nitriles. Other unsaturated monomers which can be employed in accordance with the invention are the diallyl esters of a saturated dibasic acid and the substituted allyl esters, for example, diethallyl, and dimethallyl esters. Specific examples are diallyl phthalate, diallyl adipate, sebacate, glutarate, etc.

The resinous compositions prepared in accordance with the invention are useful in the reinforced plastic art.

Obviously many modifications and variations of the invention, as hereinbefore set forth, many be made without departing from the spirit and scope thereof and, therefore, only such limitations should be imposed as are indicated in the appended claims.

We claim:

1. A process for the preparation of unsaturated polyesters which comprises first condensing to a low polymer of acid number below about 10, isophthalic acid and a mixture of ethylene and propylene glycols, and then adding maleic anhydride to the low polymer, the amount of isophthalic acid condensed with the ethylene and propylene glycols ranging from about .5 mol to about 4 mols of isophthalic acid per mol of maleic anhydride and the amount of ethylene and propylene glycols being employed in a stoichiometric excess of from about 3% to about 5% over the combined total of isophthalic acid and maleic anhydride, said specified materials being employed as essentially the sole ingredients, and continuing the polymerization to produce an unsaturated polyester useful in low-pressure or contact molding and laminating operations.

2. Composition prepared in accordance with claim 1.

3. A process for the preparation of unsaturated polyesters which comprises first condensing isophthalic acid with propylene glycol to a low polymer of acid number below about 2, then adding maleic anhydride to the low polymer, the amount of isophthalic acid condensed with the propylene glycol ranging from about 1 to about 2 mols of isophthalic acid per mol of maleic anhydride and the amount of propylene glycol being employed in about a 5 mol percent excess over the combined total of isophthalic acid and maleic anhydride, said specified materials being used as essentially the sole ingredients, and heating the mixture at a temperature of from about 215° C. to about 230° C. for about 10 to about 12 hours.

4. A composition prepared in accordance with claim 3.

5. A process for the preparation of unsaturated polyesters which comprises first condensing as essentially the sole ingredients isophthalic acid with a glycol selected from the group consisting of ethylene glycol, diethylene glycol, triethylene glycol, propylene glycol and mixtures thereof to produce a low polymer having an acid number below about 10, and then adding as essentially the sole ingredient an unsaturated aliphatic polybasic acid material selected from the group consisting of maleic acid, maleic anhydride and fumaric acid, the amount of isophthalic acid condensed with said glycol ranging from about 0.5 mol to about 4 mols of isophthalic acid per mol of unsaturated aliphatic polybasic acid material and the amount of glycol being employed in a stoichiometric excess of from about 3% to about 5% over the combined total of isophthalic acid and unsaturated aliphatic polybasic acid material and continuing the polymerization to produce an unsaturated polyester useful in low pressure or contact molding and laminating operations.

6. Composition prepared in accordance with claim 5.

7. Process according to claim 5 wherein the unsaturated aliphthatic polybasic acid is maleic anhydride.

References Cited in the file of this patent

UNITED STATES PATENTS

| | | |
|---|---|---|
| 2,443,741 | Kropa | June 22, 1948 |
| 2,516,309 | Fraser | July 25, 1950 |
| 2,627,508 | Lum | Feb. 3, 1953 |
| 2,742,445 | Lum | Apr. 17, 1956 |

FOREIGN PATENTS

| | | |
|---|---|---|
| 414,665 | Great Britain | Aug. 7, 1934 |